United States Patent [19]
Elings et al.

[11] Patent Number: 5,253,516
[45] Date of Patent: Oct. 19, 1993

[54] ATOMIC FORCE MICROSCOPE FOR SMALL SAMPLES HAVING DUAL-MODE OPERATING CAPABILITY

[75] Inventors: Virgil B. Elings; John A. Gurley, both of Santa Barbara, Calif.

[73] Assignee: Digital Instruments, Inc., Santa Barbara, Calif.

[21] Appl. No.: 883,043

[22] Filed: May 7, 1992

Related U.S. Application Data

[63] Continuation of Ser. No. 527,388, May 23, 1990, abandoned.

[51] Int. Cl.$^5$ .............................................. G01B 5/28
[52] U.S. Cl. .............................................. 73/105
[58] Field of Search ................ 73/104, 105; 356/2, 356/372, 376; 250/306, 307

[56] References Cited

U.S. PATENT DOCUMENTS

| | | | |
|---|---|---|---|
| 2,405,133 | 8/1946 | Brown | 73/105 |
| 2,460,726 | 2/1949 | Arndt, Jr. | 73/105 |
| 3,049,002 | 8/1962 | Hediger | 73/105 |
| 3,378,648 | 4/1968 | Fenner | 179/100.41 |
| 4,106,333 | 8/1978 | Salje et al. | 73/105 |
| 4,359,892 | 11/1982 | Schnell et al. | 73/105 |
| 4,724,318 | 2/1988 | Binnig | 250/307 |
| 4,861,990 | 8/1989 | Coley | 250/306 |
| 4,912,822 | 4/1990 | Zdeblick et al. | 250/306 |
| 5,015,850 | 5/1991 | Zdeblick et al. | 250/306 |

FOREIGN PATENT DOCUMENTS 1504485 8/1989 U.S.S.R. .............................. 73/105

OTHER PUBLICATIONS

"A Batch-Fabricated Silicon Accelerometer," Lynn Michelle Roylance, IEEE Transactions on Electron Devices, vol. ED-26, No. 12, Dec. 1979.

"Pressure Sensors Selection Guide PC Board Mountable", IC Sensors, Milpitas, California, TO-8 Series.

"Force Measurement Using An AC Atomic Force Microscope", William A. Ducker, et al., J. Appl. Phys. 67 (9), May 1, 1990, New York.

"Potentiometry for Thin-Film Structures Using Atomic Force Microscopy", J. Vac. Sci. Technol. A, vol. 8, No. 1, Jan./Feb. 1990; pp. 394-399, Anders et al.

*Primary Examiner*—Robert Raevis
*Attorney, Agent, or Firm*—Oblon, Spivak, McClelland, Maier & Neustadt

[57] ABSTRACT

This invention is a dual mode atomic force microscope which has significant advantages for small samples. The major point of novelty of this device is the provision for mounting samples onto the deflection mechanism, thereby allowing the tip to be separately mounted. The invention therefore allows for increased flexibility in the design of the tip, which can improve the performance of the microscope. The main configuration and several tip designs and variations of the deflection mechanism and the sample holder are described. Also, methods for using a microscope of this type are presented. The invention primarily consists of an AFM where the sample is mounted on the cantilever arm, and the tip is mounted separately, not on the cantilever arm. The cantilever arm and sample are scanned relative to the sample either by moving the sample or by moving the tip. Dual mode operation is achieved by combining cantilever arm deflection measurement by optical means with, for example, detection of a current between the tip and sample.

7 Claims, 3 Drawing Sheets

ATOMIC FORCE MICROSCOPE FOR SMALL SAMPLES HAVING DUAL-MODE OPERATING CAPABILITY

This application is a continuation of application Ser. No. 07/527,388, filed on May 23, 1990, now abandoned.

BACKGROUND OF THE INVENTION

The present invention relates to atomic force microscopes (AFMs), probe tip design for AFMs, deflection mechanism (cantilever arm) design, sample mounting for AFMs, and techniques for the use of AFMs. More specifically, this invention relates to an atomic force microscope particularly useful for scanning small samples to obtain the surface topography of a surface thereof comprising, a cantilever arm supported on one end for movement on an opposite end, the opposite end having a sample holding area thereon carrying a sample to be scanned; a scanning tip; scanning means disposed over the sample holding area and carrying the scanning tip on a scanning end thereof for moving the scanning tip over the sample in a scanning pattern; detector means for detecting movement of the opposite end of the cantilever arm and for developing a signal at an output thereof measuring an amount of movement of the opposite end of the cantilever arm; and, controller and driver means connected to the scanning means and to receive the signal from the detector means for driving the scanning means in the scanning pattern and for deriving surface image data from the signal.

Atomic force microscopes are devices that provide three dimensional topographic images of surfaces. These devices are capable of providing resolution of surface features to atomic dimensions. In an atomic force microscope (AFM), an extremely sharp tip is mounted on a very sensitive spring structure. The tip is usually positioned over a surface to be scanned such that the Van der Waals attraction between the surface and the tip and the repulsive force of the surface on the tip are very close to equilibrium. Thus, the force of the tip on the surface can be extremely low. If the tip is scanned across the sample surface, the deflection of the tip will vary with the surface structure and this modulation produces the AFM image. Alternatively, the sample may be servoed up and down such that the tip deflection and thus the tip force is kept constant. This will be referred to hereinafter as the "feedback mode". The deflection of the tip can be sensed in various ways, such as using the tunneling effect off the backside of the tip or by optical means such as beam deflection or interferometry. Typically, most current AFMs mount the tip on a low spring constant cantilever arm and sense deflection by monitoring the change in angle of reflected light off the backside of the cantilever arm.

A typical prior art AFM is illustrated in FIG. 1. The sample 10 is attached to the top of a three-axis scanner 12 which is typically a piezoelectric tube type scanner of a type well known in the art. The sample 10 is brought into close proximity to a sharp tip 14 that is attached to or part of a small, stiff cantilever arm 16. Some means of detecting the deflection of the cantilever arm 16 is required. An optical means is illustrated, where light 18 from a small laser 20 is focused onto a reflective area on the back of the cantilever arm 16 and the reflected light 18' is detected by a two-element photodetector 22. The difference between the signals from the two elements of the photodetector 22 is determined by the differencing logic 24 and the difference signal therefrom is used by the microscope controller 26 to create the desired image of the surface being scanned as well as provide feedback for scanner control by the scanner driver 28 and other functions well known in the art. The inventors herein typically operate their instruments in the feedback mode; so, vertical scan control is used to derive the image produced. Spring constants on the order of one newton/meter and lengths of 100 microns are typical parameters for the cantilever arm 16. When operated in a constant deflection mode using feedback, very small forces can be applied to the sample 10.

AFMs can operate directly on insulators as well as conductors and, therefore, can be used on materials not directly accessible to other ultra-high resolution devices such as scanning electron microscopes (SEMs) or scanning tunneling microscopes (STMs).

The tip in an AFM must be positioned with extreme accuracy in three dimensions relative to the sample. Motion perpendicular to the sample (z-axis) provides surface profile data. Motion parallel to the surface generates the scanning. In a typical system, the image is developed from a raster type scan with a series of data points collected by scanning the tip along a line (x-axis), displacing the tip perpendicularly in the image plane (y-axis), and repeating the step and scan process until the image is complete. The precise positioning in x, y, and z required to generate atomic scale images is usually accomplished with a piezoelectric device as the scanner 12. Piezoelectric devices can be made to expand or contract by applying voltages to electrodes that are placed on the piezoelectric material. The motions produced can be extremely small, with sensitivities as low as tens of angstroms per volt. The total deflection possible for these scanners is typically less than 100 microns. Scanners with different sensitivities are used for different applications, with low sensitivity used for atomic resolution images and higher sensitivity scanners used for lower resolution, larger area images. The design of piezoelectric scanners, including the shape of the scanner and the placement of electrodes, is well known in the art.

In an AFM, either the sample can be attached to the scanner and the tip held stationary or the tip can be attached to the scanner and the sample fixed. Typically, most existing AFMs scan the sample. As the tip is scanned in x and y, the z axis movement is closely coupled to the tip deflection. In an AFM, either the tip deflection can be monitored as the sample is scanned or the z position can be varied, with feedback, to maintain the deflection constant. Modulating the z position with feedback is useful for minimizing the contact force between the tip and the sample, and also allows the AFM to be used for other measurements, such as stiffness.

Most AFMs use optical means to measure tip deflection. As described above with respect to FIG. 1, one method focuses a light beam onto a reflective surface on the back of the cantilever arm. As the cantilever arm moves up and down in response to the sample topography, the reflected beam moves up and down on a photodetector which develops a signal which is used for image or feedback calculation. Other optical means use interference techniques. In one interference method, a laser diode is placed very close to the cantilever arm such that the light reflected off the cantilever arm is reflected back into the laser diode. The laser power will vary with the relative phase of the reflected light and the output light. The phase is dependent on the distance of the diode from the cantilever arm and, thus, laser power will vary with the cantilever arm deflection. Another interference method is to build a small interferometer using a fixed mirror and the cantilever arm back, and to inject the light into the interferometer with fiber optics.

All existing prior art AFMs mount a probe tip on a cantilever arm arrangement. The tip is then scanned over a sample and the deflection of the cantilever arm provides the surface information. For an AFM to operate, the cantilever arm must exert very small forces on the sample and have reasonably fast response to surface variations. To achieve these requirements, the cantilever arm has to be very small and very stiff. Typical cantilever arms are a few 100 microns long and 10s of microns wide at the tip end. Therefore, the tip which is mounted on the end of the cantilever arm has to be extremely small or its mass will decrease the resonant frequency of the cantilever arm. The resonant frequency is a measure of the stiffness and, therefore, the response time of the cantilever arm-to-surface variations.

The requirement for small mass for AFM tips limits the flexibility in choice of tip material and design. Typically, existing AFM tips have not been made with as small tip angles as have been achieved with STM tips, which are attached to the scanner and are not as constrained as to size and mass. For instance, existing AFM tips have been made from diamond chips, etched silicon, or etched silicon nitride, which are quite stiff and atomically sharp, but which have tip profiles of 30–90 degrees. Also, these tips are not good electrical conductors. Such a tip is shown in an article by K. Wickramasinghe, Scientific American, October 1989, pg 98. By comparison, STM tips made from etched tungsten wire are also atomically sharp, but have tip profiles of 5–10 degrees, and are superior for measuring surface topography which has steep inclines. It would be very difficult, however, to produce an etched tungsten wire that was small enough, could be mounted to a cantilever arm, and be easily replaceable.

Wherefore, it is an object of the present invention to provide an atomic force microscope of the cantilever arm type which is able to employ tips made from etched wire, or the like, without the detrimental effects normally attendant to their large mass.

It is another object of the present invention to provide an atomic force microscope of the cantilever arm type which mounts the sample on the cantilever arm and mounts the tip separately.

It is still another object of the present invention to provide an atomic force microscope of the cantilever arm type which is particularly suited for scanning small samples.

It is yet another object of the present invention to provide a microscope which can operate either as an atomic force or tunneling microscope; or, as a combination.

Other objects and benefits of this invention will become apparent from the detailed description which follows hereinafter when taken in conjunction with the drawing figures which accompany it.

SUMMARY

The foregoing objects have been achieved by the atomic force microscope of this invention which is particularly useful for scanning small samples to obtain the surface topography of a surface thereof and which comprises, a cantilever arm supported on one end for movement on an opposite end, the opposite end having a sample holding area thereon carrying a sample to be scanned; a scanning tip; scanning means disposed over the sample holding area and carrying the scanning tip on a scanning end thereof for moving the scanning tip over the sample in a scanning pattern; detector means for detecting movement of the opposite end of the cantilever arm and for developing a signal at an output thereof measuring an amount of movement of the opposite end of the cantilever arm; and, controller and driver means connected to the scanning means and to receive the signal from the detector mean for driving the scanning means in the scanning pattern and for deriving surface image data from the signal.

Preferably, the cantilever arm is removeably held by a structural member of the atomic force microscope and the scanning tip is removeably held by the scanning end of the scanning means. In one embodiment, the cantilever arm is held by a removeable mounting block and the removeable mounting block and the structural member each contain alignment marks for accurately positioning the cantilever arm in the atomic force microscope.

In one variation, the cantilever arm is held by a removeable mounting block; the structural member is adapted to removeably receive a plurality of mounting blocks containing individual cantilever arms with samples thereon for scanning at a plurality of scanning stations; and, the scanning tip is positionable over respective ones of the scanning stations.

Also in the preferred embodiment, the sample holding area comprises a flat area formed on the opposite end of the cantilever arm. For certain applications the sample holding area can have an atomically flat top surface upon which a sample to be scanned is located.

In one embodiment, the detector means comprises light producing means for directing a beam of light onto a surface of the cantilever arm and photodetector means for receiving the beam of light as reflected from the surface of the cantilever arm and for developing the signal at an output thereof. For dual mode operation, there are also means for applying a bias voltage between the scanning tip and the cantilever arm and supplemental detector means for detecting a current between the scanning tip and a sample mounted on the cantilever arm and for developing a supplemental signal at an output thereof measuring the amount of the current. Also, the controller and driver means is connected to receive the supplemental signal from the current detecting means for deriving supplemental surface data from the supplemental signal.

In another embodiment, the cantilever arm is made of a piezoelectric material and the detector means comprises means for sensing electrical voltages developed by the cantilever arm as a result of bending thereof.

DESCRIPTION OF THE PREFERRED EMBODIMENT

Figure 2:
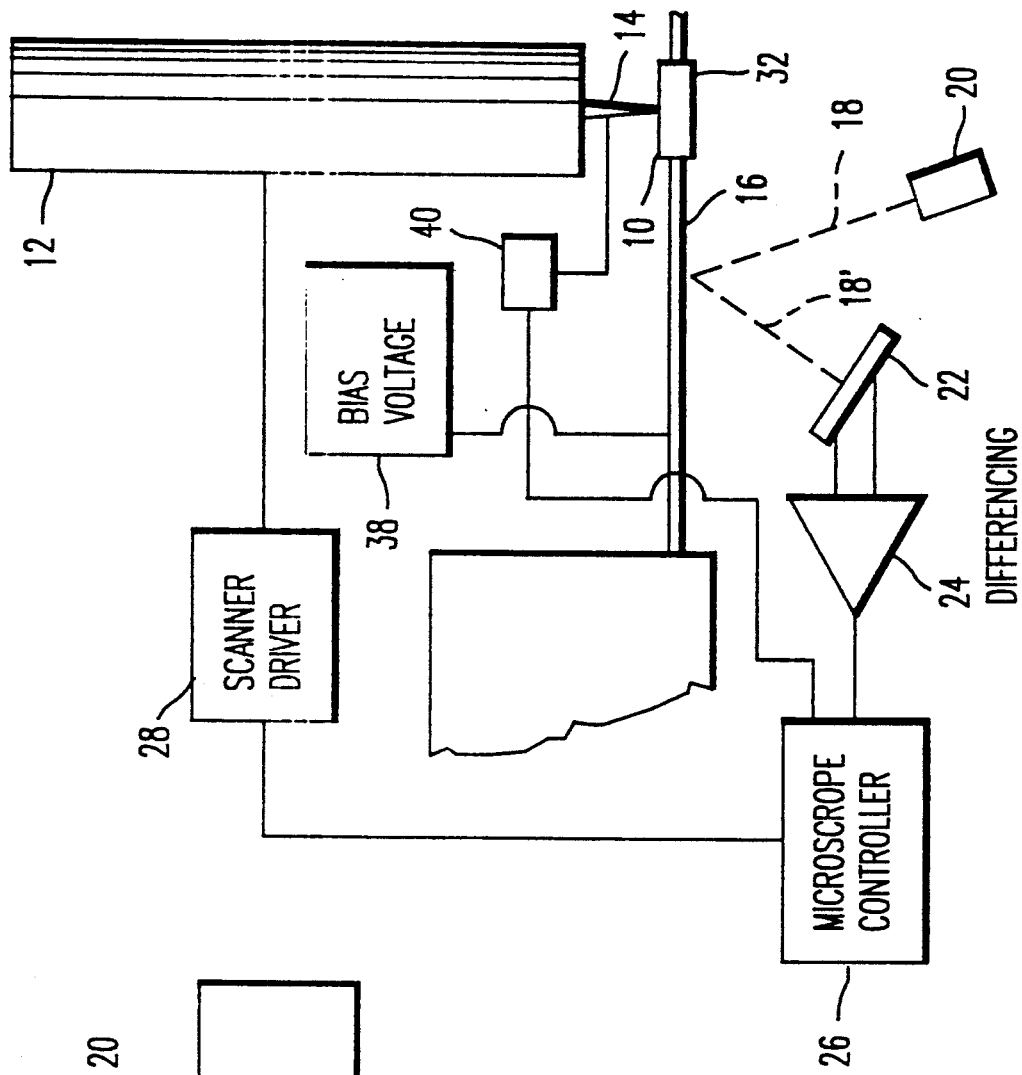
FIG. 2 is a simplified partial functional block diagram of an AFM according to the present invention.
Figure 1:
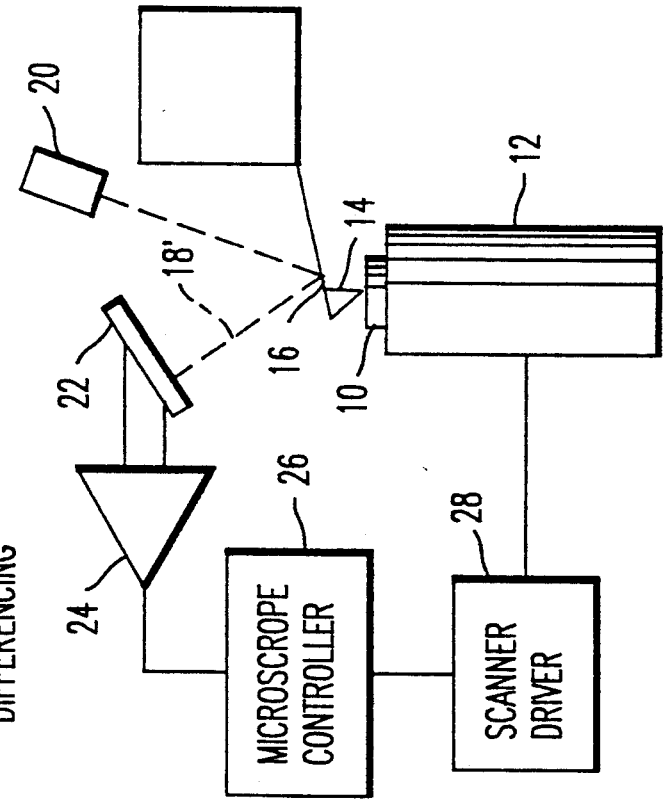
FIG. 1 is a simplified partial functional block diagram of a prior art AFM.

The basic mode of operation of an atomic force microscope (AFM) according to the present invention is illustrated in FIG. 2 where it is generally indicated as 30. Contrary to the accepted prior art approach to AFMs as described above, in the AFM 30 of this invention the sample 10 is attached to the cantilever arm 16. In this particular implementation, the probe tip 14 is removeably attached to the end of the scanner 12 in the manner of a typical prior art STM. Thus, as mentioned above as an object of the invention, the AFM 30 is able to employ tips 14 made from etched tungsten wire, or the like, without the detrimental effects normally attendant thereto. In this embodiment, deflection detection takes place in substantially the same fashion as in the prior art AFM of FIG. 1, i.e. relying on reflectance off the back of the cantilever arm 16.

As those skilled in the art will undoubtedly recognize and appreciate immediately, the AFM 30 of this invention offers significant improvement over prior art AFMs for small samples as the choice in tip design and configuration is much wider than in conventional AFMs (due to the ability to use tip materials unsuitable for mounting on the cantilever arm). The sample 10, of course, must be small enough so that when it is attached to the cantilever arm 16, it does not unduly affect the resonant frequency of the cantilever arm 16. For use in an AFM according to the present invention, it is preferred that the cantilever arm 16 be manufactured such that there is a small flat sample area, as at 32, upon which the sample 10 can be located. The invention is most useful for samples 10 that can be put on the cantilever arm 16 (i.e. on the sample area 32) by methods such as vacuum evaporation, wet chemistry, or aqueous solution. It should be noted that the ability to use scanning tips with small angle tip profiles makes this AFM extremely useful for the study of biological substances which, in many cases, can be conveniently deposited onto a small sample area 32 by the above-mentioned techniques. The small size of the sample area 32 coupled with the use of a large scan, e.g. up to about 15 microns, allows for ease in locating regions of interest.

As the tip 14 and scanner 12 configuration in the AFM 30 can be made virtually identical to a prior art scanning tunneling microscope (STM) configuration, this invention allows the interchangeability of AFM and STM measurements. As those skilled in the art will readily recognize and appreciate, this is potentially a very important feature of the present invention. For instance as depicted in FIG. 2, using a metal tip such as tungsten and a conducting cantilever arm, or an insulating cantilever arm that has been coated with a conductive material, a bias voltage 38 could be applied between the cantilever arm 16 (and sample 10) and the tip 14. As the sample 10 is scanned, the current can be detected at 40 and used in the feedback system as in a standard STM; but, additionally, the force interaction between the sample 10 and tip 14 can be measured by monitoring the deflection of the cantilever arm 16. In this manner, one could image the sample topography from either the current or cantilever arm deflection data. This dual imaging mode would, of course, provide more information about the sample 10 than could be obtained with prior art STMs or AFMs alone. As those skilled in the art will readily recognize and appreciate, this dual imaging mode of the present invention can also be used in prior art designs where the tip is on the cantilever.

The feedback system controlling the vertical position of the tip 14 could use either the cantilever arm 16 deflection signal or the tunneling current signal—i.e., the feedback could be determined by the force on the sample 10, by the tunneling current, or by a combination of the two. For example, the cantilever arm 16 deflection and tunneling current signals could be used in the feedback on alternate scan lines to make two images—one topography at constant tunneling current and the other topography at constant force. This could also be done by operating in the STM mode while scanning to the right and in the AFM mode while scanning to the left. This is an important aspect of the present invention because in present prior art scanning microscopes, only data from one direction is used. In another mode or operation according to the present invention, the instrument could be used to make STM images of objects which have insulating regions. In prior art STMs, the feedback loop will drive the tip 14 into the sample 10 when it is over an insulating region thereby destroying the tip 14. Employing the present invention to prevent this, the feedback could be operated in the STM mode while monitoring the cantilever arm 16 deflection signal. Over insulating regions, the feedback would advance the tip 14 toward the surface in order to keep the tunneling current constant. This, of course, would cause the tip 14 to press on the surface and bend the cantilever arm 16. When the bending reaches a threshold limit, the instrument could then switch to using the cantilever arm 16 deflection signal for the feedback to keep the force of the tip 14 on the sample 10 constant. The tip 14 would then continue to scan in this way until the tip 14 scanned over a conducting region where a tunneling current would again occur. At that point, the instrument could revert to the STM mode where the tunneling current would again be kept constant by the feedback loop. Still another mode of operation made possible with the present invention is to use the cantilever arm 16 deflection signal for the feedback control of the tip 14 and to record the current through the tip 14 in order to map out the conductivity of the surface of the sample 10. Again, as those skilled in the art will readily recognize and appreciate, this method of scanning of the present invention can also be used in prior art designs where the tip is conducting.

Figure 3:
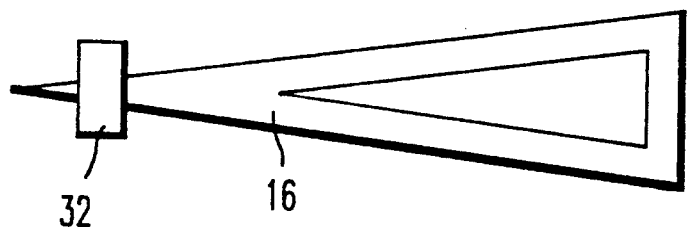
FIG. 3 is a simplified top view drawing of a cantilever arm for use in the present invention.
Figure 4:
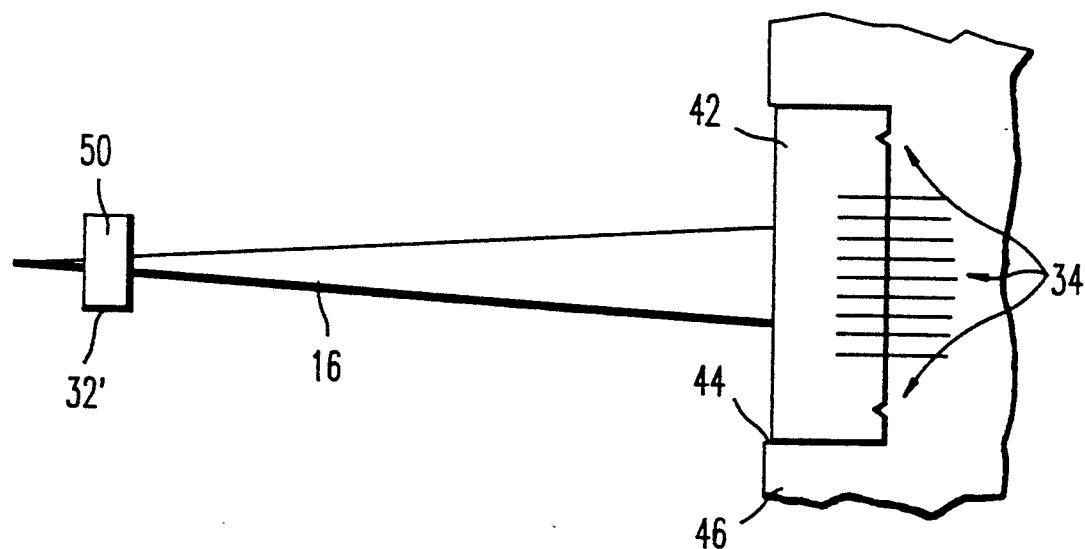
FIG. 4 is a simplified top view drawing of a cantilever arm for use in the present invention generally as in FIG. 3; but, with provision for an atomically flat sample area and with the addition of indexing marks for alignment and a mounting block carrying the cantilever arm for ease of replaceably mounting of the cantilever arm within the AFM.
Figure 5:
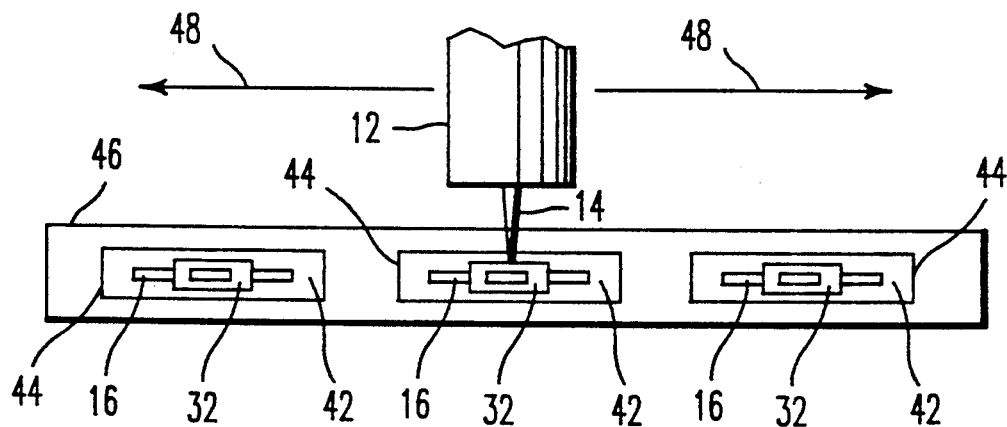
FIG. 5 is a simplified front view drawing of an AFM according to the present invention employing multiple, replaceable cantilever arms which can be scanned sequentially to scan multiple samples at one loading of the AFM with a single scanning tip.

As mentioned above, the preferred cantilever arm 16 for the AFM 30 of this invention would have a flat sample area 32 formed near the narrow end for the placing of the sample 10 thereon. Such a cantilever arm 16 is shown in a top view in FIG. 3. The flat sample area 32 should be very thin such that little mass is added to the end of the cantilever arm 16. The preferred flat sample area 32 is on the order of 20 microns square, as this area is about the maximum range of a piezoelectric scanner 12 that is capable of atomic resolution. The cantilever arm 16 could be made very inexpensively using known integrated circuit technology such that the cantilever arms 16 could be disposable. Thus, for each new sample 10, a new cantilever arm 16 could be used. The cantilever arms 16 could be made accurately enough employing contemporary integrated circuit technology so as to have edges or some indexing provision that could be used to position the cantilever arms 16 within a few microns. These cantilever arms 16 would always be properly aligned with the deflection detection system. Such a cantilever arm 16 is illustrated in FIG. 4 wherein the alignment provisions as mentioned above in two possible forms are generally indicated as 34. As illustrated therein, the alignment means could be in the form of a positive detent or simply indexing marks which the operator aligns visually. FIG. 4 also illustrates a preferred method of factory-mounting the cantilever arm 16 to a removable mounting block 42 which is held in a slot 44 provided therefore in a structural member 46 of the AFM 30. Mass produced cantilever arms 16 of this type could be installed and removed quickly. Also, as depicted in FIG. 5, one tip 14 could be used to image several samples 10 simply by placing a series of cantilever arm/samples held in blocks 42 into the instrument and scanning each sample in turn as indicated by the arrows 48. In such case, the sample holder would have to be shiftable from one scanning position over a block 42 to another. Another aspect or modification to the cantilever arm 16 as useful in the AFM 30 of this invention is also shown in FIG. 4. In this embodiment, the flat sample area 32' has an atomically flat top surface 50 where samples 10 could be placed. This atomically flat sample area 32' could be used to obtain high resolution images of small molecules which require a flat background for topography measurements. The flat top surface 50, could be, for instance, graphite, mica, or gold deposited on silicon or mica.

Figure 6:
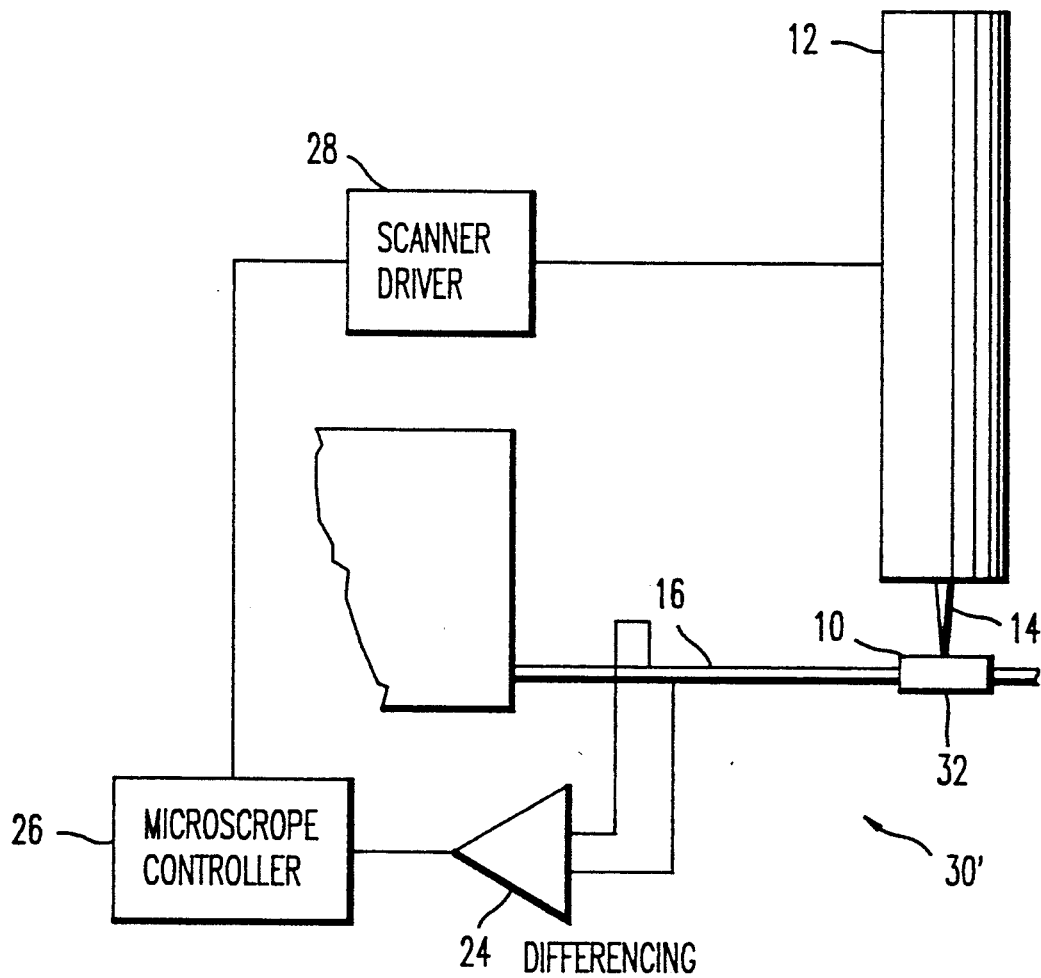
FIG. 6 is a simplified partial functional block diagram of an AFM according to the present invention when employing a cantilever arm of piezoelectric material.

Still another cantilever arm 16' that would be useful is a cantilever arm 16' made of piezoelectric material as depicted in the AFM 30' of FIG. 6. A piezoelectric cantilever arm 16' could operate by having the deflection of the cantilever arm 16', as output on the wires 36 attached thereto by the change in voltage developed by the cantilever arm 16' itself, sensed by the logic 24 and the microscope controller 26. This type of AFM could be very simple mechanically, which could be advantageous for applying samples 10 to the cantilever arm 16'.

In summary, it can be seen that this invention provides an Atomic Force Microscope that, for small samples, exhibits improved performance over existing AFMs. The invention includes a probe tip, a means for mounting the sample onto a cantilever arm, and a means for detecting the deflection of the cantilever arm when the probe tip is scanned over the sample. It also includes several novel cantilever arms particularly useful for the microscope. It also includes implementation for different cantilever arm deflection detection means and methods for the use of the microscope and cantilever arms. It also provides the ability to operate either as an AFM or an STM.

Wherefore, having thus described the present invention, what is claimed is:

1. An atomic force microscope useful for scanning small samples to obtain the surface topography and other surface information of a surface thereof, comprising:

a cantilever arm supported on one end for movement on an opposite end, said opposite end having a sample holding area thereon carrying a sample to be scanned, said cantilever arm being removably held by a structural member of the atomic force microscope;

a scanning tip;

scanning means disposed over said sample holding area and carrying said scanning tip on a scanning end thereof for moving said scanning tip over said sample in a scanning pattern;

detector means for detecting movement of said opposite end of said cantilever arm and for developing a signal at an output thereof reflecting an amount of movement of said opposite end of said cantilever arm;

controller and driver means connected to said scanning means and to receive said signal from said detector means for driving said scanning means in said scanning pattern and for deriving surface image data from said signal;

wherein:

said cantilever arm is held by a removable mounting block;

said structural member is adapted to removable receive a plurality of mounting blocks containing individual cantilever arms with samples thereon for scanning at a plurality of scanning stations; and, said scanning tip is positionable over respective ones of said scanning stations.

2. In a scanning probe microscope having a scanning tip, scanning means for causing movement of the scanning tip over a surface of a sample in a scanning pattern, and a cantilever arm supported on one end for movement on an opposite end relative to characteristics of the surface of the sample, the improvement for selectively operating the atomic force microscope in either or both of dual modes comprising:

first detector means for detecting movement of the opposite end of the cantilever arm and for developing a first signal at an output thereof indicative of the amount of movement of the opposite end of the cantilever arm;

means for applying a bias voltage between the scanning tip and the sample;

second detector means for detecting a current between the scanning tip and the sample and for developing a second signal at an output thereof indicative of the amount of said current; and, controller and logic means for generating surface data from said first signal and for generating supplemental surface data from said second signal;

wherein the scanning means moves the scanning tip over the surface of the sample in a scanning pattern comprising a plurality of adjacent scan lines and wherein additionally:

said controller and logic means includes means for employing said first signal on alternate ones of the scan lines whereby at that time the scanning probe microscope operates as an atomic force microscope and for employing said second signal on the remaining ones of the scan lines whereby at that time the scanning probe microscope operates as a scanning tunneling microscope.

3. In a scanning probe microscope having a scanning tip, scanning means for causing movement of the scanning tip over a surface of a sample in a scanning pattern, and a cantilever arm supported on one end for movement on an opposite end relative to characteristics of the surface of the sample, the improvement for selectively operating the atomic force microscope in either or both of dual modes comprising:

first detector means for detecting movement of the opposite end of the cantilever arm and for developing a first signal at an output thereof indicative of the amount of movement of the opposite end of the cantilever arm;

means for applying a bias voltage between the scanning tip and the sample;

second detector means for detecting a current between the scanning tip and the sample and for developing a second signal at an output thereof indicative of the amount of said current; and, controller and logic means for generating surface data from said first signal and for generating supplemental surface data from said second signal;

wherein the scanning means moves the scanning tip over the surface of the sample in a scanning pattern comprising a plurality of adjacent scan lines and wherein additionally:

said controller and logic means includes means for employing said first signal while scanning the scan lines in one direction whereby at that time the scanning probe microscope operates as an atomic force microscope and for employing said second signal while scanning the scan lines in an opposite direction whereby at that time the scanning probe microscope operates as a scanning tunneling microscope.

4. In a scanning probe microscope having a scanning tip, scanning means for causing movement of the scanning tip over a surface of a sample in a scanning pattern, and a cantilever arm supported on one end for movement on an opposite end relative to characteristics of the surface of the sample, the improvement for selectively operating the atomic force microscope in either or both of dual modes comprising:

first detector means for detecting movement of the opposite end of the cantilever arm and for developing a first signal at an output thereof indicative of the amount of movement of the opposite end of the cantilever arm;

means for applying a bias voltage between the scanning tip and the sample;

second detector means for detecting a current between the scanning tip and the sample and for developing a second signal at an output thereof indicative of the amount of said current; and, controller and logic means for generating surface data from said first signal and for generating supplemental surface data from said second signal;

wherein the microscope is primarily employed as a scanning tunneling microscope and additionally including for the protection of the scanning tip:

said controller and logic means including means for monitoring said first signal and for controlling the scanning tip with said first signal whenever said first signal exceeds a pre-established threshold whereby damage to the scanning tip from being forced into the surface of the sample as a function of said second signal at insulating areas of the surface of the sample being scanned is prevented.

5. In a scanning probe microscope having a scanning tip, scanning means for causing movement of the scanning tip over a surface of the sample in a scanning pattern, and a cantilever arm supported on one end for movement on an opposite end relative to characteristics of the surface of the sample, the method of selectively operating the atomic force microscope in either or both of dual modes comprising the steps of:

detecting movement of the opposite end of the cantilever arm and developing a first signal at an output thereof indicative of the amount of movement of the opposite end of the cantilever arm;

applying a bias voltage between the scanning tip and the sample;

detecting a current between the scanning tip and the sample and developing a second signal at an output thereof indicative of the amount of the current; and, generating surface topography data from the first signal and generating supplemental surface data from the second signal;

wherein the scanning means moves the scanning tip over the surface of the sample in a scanning pattern comprising a plurality of adjacent scan lines and additionally including the steps of:

employing the first signal on alternate ones of the scan lines whereby at that time the scanning probe microscope operates as an atomic force microscope; and, employing the second signal on the remaining ones of the scan lines whereby at that time the scanning probe microscope operates as a scanning tunneling microscope.

6. In a scanning probe microscope having a scanning tip, scanning means for causing movement of the scanning tip over a surface of the sample in a scanning pattern, and a cantilever arm supported on one end for movement on an opposite end relative to characteristics of the surface of the sample, the method of selectively operating the atomic force microscope in either or both of dual modes comprising the steps of:

detecting movement of the opposite end of the cantilever arm and developing a first signal at an output thereof indicative of the amount of movement of the opposite end of the cantilever arm;

applying a bias voltage between the scanning tip and the sample;

detecting a current between the scanning tip and the sample and developing a second signal at an output thereof indicative of the amount of the current; and, generating surface topography data from the first signal and generating supplemental surface data from the second signal;

wherein the scanning means moves the scanning tip over the surface of the sample in a scanning pattern comprising a plurality of adjacent scan lines and additionally including the steps of:

employing the first signal while scanning the scan lines in one direction whereby at that time the scanning probe microscope operates as an atomic force microscope; and, employing the second signal while scanning the scan lines in an opposite direction whereby at that time the scanning probe microscope operates as a scanning tunneling microscope.

7. In a scanning probe microscope having a scanning tip, scanning means for causing movement of the scanning tip over a surface of the sample in a scanning pattern, and a cantilever arm supported on one end for movement on an opposite end relative to characteristics of the surface of the sample, the method of selectively operating the atomic force microscope in either or both of dual modes comprising the steps of:

detecting movement of the opposite end of the cantilever arm and developing a first signal at an output thereof indicative of the amount of movement of the opposite end of the cantilever arm;

applying a bias voltage between the scanning tip and the sample;

detecting a current between the scanning tip and the sample and developing a second signal at an output thereof indicative of the amount of the current; and, generating surface topography data from the first signal and generating supplemental surface data from the second signal;

wherein the microscope is primarily employed as a scanning tunneling microscope and for the protection of the scanning tip additionally including the step of:

monitoring the first signal and controlling the scanning tip with the first signal whenever the first signal exceeds a pre-established threshold whereby damage to the scanning tip from being forced into the surface of the sample as a function of the second signal at insulating areas of the surface of the sample being scanned is prevented.

* * * * *